United States Patent
Kunert et al.

[11] 3,945,014
[45] Mar. 16, 1976

[54] WINDSHIELD ANTENNA WITH COUPLING NETWORK IN THE LEADIN

[75] Inventors: Heinz Kunert, Cologne; Heinz Moebs, Herzogenrath; Gerd Sauer, Broichweiden, all of Germany

[73] Assignee: Saint-Gobain Industries, Neuilly-sur-Seine, France

[22] Filed: Dec. 28, 1973

[21] Appl. No.: 429,208

Related U.S. Application Data

[63] Continuation of Ser. No. 126,627, March 22, 1971, abandoned.

[30] Foreign Application Priority Data

Mar. 21, 1970  Germany.................... 7010571[U]

[52] U.S. Cl.................................. 343/713; 343/850
[51] Int. Cl.² ........................................ H01Q 1/32
[58] Field of Search ............ 343/711, 712, 713, 850

[56] References Cited
UNITED STATES PATENTS

| | | | |
|---|---|---|---|
| 2,657,312 | 10/1953 | Saranga | 343/727 |
| 3,210,764 | 10/1965 | Anderson et al. | 343/708 |
| 3,414,902 | 12/1968 | Shaw | 343/713 |
| 3,453,618 | 7/1969 | Ukmar et al. | 343/715 |
| 3,484,584 | 12/1969 | Shaw | 219/522 |
| 3,576,576 | 4/1971 | Jensen | 343/712 |
| 3,599,214 | 8/1971 | Altmayer | 343/713 |
| 3,771,159 | 11/1973 | Kawaguchi et al. | 343/713 |

FOREIGN PATENTS OR APPLICATIONS

| | | | |
|---|---|---|---|
| 811,295 | 4/1959 | United Kingdom | 317/261 |
| 1,314,455 | 12/1962 | France | 343/713 |

*Primary Examiner*—Eli Lieberman
*Attorney, Agent, or Firm*—Pennie & Edmonds

[57] ABSTRACT

Antennas are applied to broad surfaces of electrically non-conductive material, and electronic adapters such as self-inductors, transformers, and capacitors are constructed in the same way and attached to the antenna on the surface of the material, affording improved output of the antenna and better reception in the receiver. Such apparatus is useful on vehicular windshields such as those of aircraft and automobiles, and on the windows of buildings such as of apartment houses.

3 Claims, 7 Drawing Figures

INVENTORS
HEINZ KUNERT
HEINZ MOEBS
GERD SAUER
BY: Bauer and Seymour

WINDSHIELD ANTENNA WITH COUPLING NETWORK IN THE LEADIN

This is a continuation of application Ser. No. 126,627 filed Mar. 22, 1971, now abandoned.

This invention relates to windows with antenna incorporated. As such are of value in automobiles, the invention will be described in its application to an automobile windshield without limiting the generality of its application, which is equally useful in aircraft and buildings, such as apartment houses.

A number of forms of such windshields are known, for instance one in which the antenna is incorporated in the plastic interliner of sandwich type safety glass and another in which it is applied to the inner or outer surface of a single sheet of tempered glass. Such antenna have been made from conductive lines, printed on the surface of the pane, composed of silver paste and baked on.

Although the antenna can be placed on any pane of the car it is usually applied to the windshield because of proximity to the receiver, which provides a minimum length of lead, whereas to apply it to the back window leaves the windshield unobstructed but demands a long lead, which requires some sort of booster to overcome the drop in voltage.

It is an object of this invention to overcome the insufficiencies of antennas mounted on window panes by incorporating therein a booster in the nature of transformer, inductance, or capacity.

The objects are accomplished, generally speaking, by incorporating in the antenna an electronic adapter component such as a self-inductance, a capacity, and a shrouded conductor or transformer, which are placed directly on the pane with the antenna, type and form being chosen to suit the particular circumstances. In a preferred form of the invention the electronic adapter is formed out of the same conductive paste as the antenna, applied in one operation, and baked on at the same time, the whole constituting a single operation.

The invention is applicable to all sorts of panes, glass, glass and plastic, and plastic alone, for example, and to non-conductive but opaque surfaces, for that matter. In the windshield form the same silver composition is often used, applied, and baked for antenna and adapter, although different compositions can be used.

It is noted that some automobile windshields are wholly or partly made of plastic which will not withstand the same temperatures as glass. When the application is to plastic surfaces the conductive composition employed to form the antenna and the adapter should be one which does not require high temperature bake. Such compositions are known and need not be detailed here.

The following drawings illustrate the invention as applied to an automobile windshield without detracting from the generality of its application:

Figure 1:
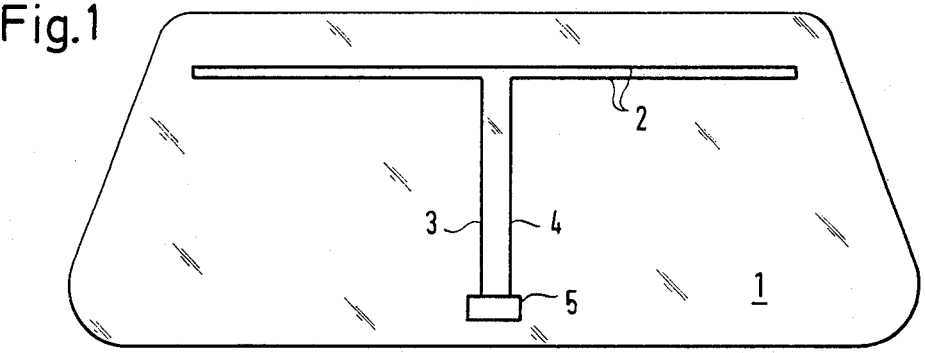
FIG. 1 represents an elevational view of a windshield with an antenna applied and connected at its ends to an electronic adapter which is illustrated schematically.

The pane 1 of FIG. 1 represents the back window of an automobile which may be presumed to be a single sheet of tempered glass or of any other type such as sandwich safety glass. On the inside surface of the pane, that which faces the interior of the vehicle, is applied two horizontal lines of conductors 2 which serve as the antenna proper. These lines are continued vertically at 3 and 4 and connected to the electronic adapter 5. This is a dipole antenna and its parts are advantageously constituted by straight lines of a width of a few tenths of a millimeter made of conductive compositions of silver paste baked onto the surface of the glass. In place of the dipolar antenna one can use an antenna of one pole and of any shape. Furthermore, one may use a single antenna or several connected in series or parallel.

At the end of the two conductors 3 and 4 is connected the electronic adapter 5, various forms of which are illustrated in FIGS. 2–7. There is also indicated on these figures the contact by which the antenna may be connected to the receiver.

Figure 2:
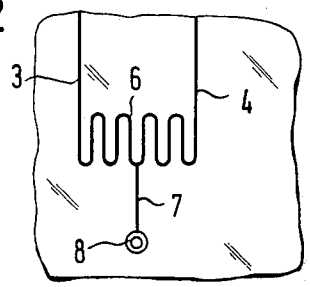
FIGS. 2 through 5 represent several forms of electronic adapters as applied to the windshield and connected in the receiving line.

In FIG. 2 the electronic adapter is a symmetrical transformer 6 which is connected at its ends to antenna conductors 3, 4 and at its middle turn by conductor 7 to contact 8. This contact may be invisioned as a stud baked onto an enlargement forming the end of the line 7, the enlargement being itself baked onto the surface of the glass. The number and size of the turns of the transformer are chosen according to the characteristics of the conductors which serve as the antenna and of the connecting cable. For a given type of automobile they will be chosen once for all just as all other types of apparatus are.

Figure 3:
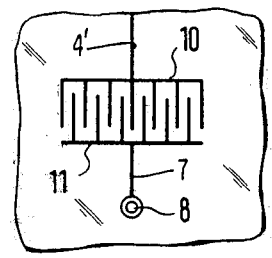

In FIG. 3 it is assumed that the antenna is composed of a single line 2 and a single connection 4' which is connected to a pure capacity. The pure capacity is formed of two systems of conductors in the shape of opposed combs 10, 11 with overlapping teeth. The armature 10 is connected to the antenna 4' and the armature 11 is connected to contact stud 8. The antenna, the conductors 4', 7, and the condensers 10, 11 are formed of the same silver composition, are applied by printing, for example the silk screen, and are baked when the nature of the pane admits of it.

Figure 4:
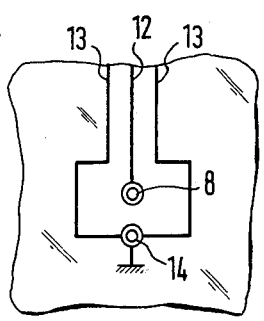

FIG. 4 represents a blindage for the antenna conductor 12, which is similar to 4'. Two lateral lines 13 are applied to the pane in the same plane as the conductor 12 and parallel to it and on opposite sides of it. These conductors 13 are prolonged until they make a common connection 14 with the envelope of a coaxial cable, the core of which is connected to the contact 8.

Figure 5:
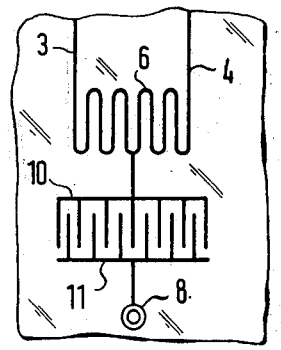

FIG. 5 represents the alignment in series of the electronic adapters of FIGS. 2 and 3 thus including a symmetrical transformer 6 and a capacity 10–11. Parallel connection is also possible.

The forms of the invention described hereinabove can be applied to the pane as electronic adapters having only two dimensions. But, when the automobile windshield is composed of sandwich glass, these adapters may also be placed on the surface of one of the two sheets of glass which are in contact with the interlayer of plastic, such as polyvinyl butyral.

Figure 6:
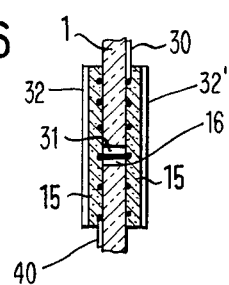
FIG. 6 is a vertical sectional view through the apparatus shown in elevation in FIG. 7.
Figure 7:
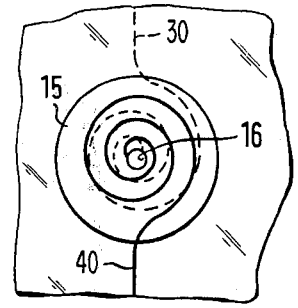

It is thus possible to shape the electronic adapter in three dimensions disposing parts on opposite sides of the pane in the same location, the pane being unitary or layered. FIG. 6 is a vertical sectional view through the apparatus shown in elevation in FIG. 7. The pane 1 is apertured at 31, the connection 30 brings in the output of the antenna and is disposed in the form of a spiral 15 on one of the faces of the pane. The inner end of the spiral passes through the opening 31 and is formed onto a spiral 16 on the face of the glass opposite spiral 15. The outer end of the spiral is connected by a conductor 40 to the contact stud not shown. Plates of ferrite 32, 32' cover the spiral coils to increase the value of the induction.

It is equally possible to use capacities in three dimensional form by constructing conductive layers on opposite sides of the same sheet of glass, without any interconnection, or in the case of layered safety glass such conductive plates can be formed on opposite sides of the plastic interlayer. Similarly the conductors of blindage may be disposed in this way in one or several planes other than that which contains the blinded conductors themselves, so that the blindage is improved.

All of the electronic adapters which have been described may be applied to the surface of the glass with a thickness of 5–20 microns for example, using the impressions of a silk screen, being thereafter baked on the surface of the glass at adequately high temperature, this method of manufacture being easier and more satisfactory than certain others. If necessary these electronic adapters may be modified by a galvanoplastic reinforcement.

This invention provides antennas of materially improved efficiency by interposing electronic adapters between the antennas and the receiver, the adapters being formed of the same material as the antenna, connected thereto, and affixed to the supporting body in the same way. Different types of adapter may be employed, for instance self-inductances, condensers, and transformers and these may be used singly or in various combinations. When used in automobiles, they may be applied to any window but preferably to the windshield or the back light. The lines are extremely fine and thin and offer practically no obstruction to vision. When baked on they are relatively permanent. Their effect may be changed by making them of different sizes and combinations to perfectly adapt them to a particular situation such as the use of a particular type of receiver and a particular location. The invention does not require a new technique of application, that commonly used in applying antennas to windshields being adequate, for example the silk screen technique.

As many apparently widely different embodiments of the present invention may be made without departing from the spirit and scope thereof, it is to be understood that the invention is not limited to the specific embodiments.

What is claimed is:

1. A window comprising a sheet of glass, an elongated antenna having a pair of conductors affixed to one surface of said sheet, an output terminal fixedly mounted on said surface of said sheet, first conductive means constituting a discrete lumped electrical reactance affixed to said surface of said sheet, said first conductive means including in series an inductive reactance and a capacitive reactance, second conductive means affixed to said surface of said sheet and conductively connecting said conductors to the ends of said inductive reactance, and third conductive means affixed to said surface of said sheet and conductively connecting said capacitive reactance to said output terminal, said conductors and each of said conductive means consisting essentially of a conductive composition of silver paste baked onto said surface of said sheet.

2. The window of claim 1 wherein said capacitive reactance is connected at a middle turn of said inductive reactance.

3. The window of claim 2 wherein said capacitive reactance includes oppositely disposed combs with intercalated teeth.

* * * * *